United States Patent
Park et al.

(10) Patent No.: US 9,933,814 B2
(45) Date of Patent: Apr. 3, 2018

(54) COMPUTING DEVICE WITH A ROTABLE DISPLAY MEMBER

(71) Applicant: HEWLETT-PACKARD DEVELOPMENT COMPANY, L.P., Houston, TX (US)

(72) Inventors: Chan Park, Houston, TX (US); Wen-Yo Lu, Houston, TX (US); Chad Patrick Paris, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/308,311

(22) PCT Filed: Jun. 27, 2014

(86) PCT No.: PCT/US2014/044527
§ 371 (c)(1),
(2) Date: Nov. 1, 2016

(87) PCT Pub. No.: WO2015/199713
PCT Pub. Date: Dec. 30, 2015

(65) Prior Publication Data
US 2017/0115688 A1    Apr. 27, 2017

(51) Int. Cl.
*G06F 1/16* (2006.01)
(52) U.S. Cl.
CPC ............ *G06F 1/162* (2013.01); *G06F 1/1681* (2013.01)
(58) Field of Classification Search
CPC ............................... G06F 1/1618; G06F 1/162
See application file for complete search history.

(56) References Cited

U.S. PATENT DOCUMENTS

| | | | |
|---|---|---|---|
| 5,231,734 A | 8/1993 | Rude | |
| 5,666,694 A | 9/1997 | Slow et al. | |
| 6,034,867 A | 3/2000 | Seo | |
| 6,266,236 B1 * | 7/2001 | Ku | G06F 1/162 312/223.1 |
| 6,980,423 B2 | 12/2005 | Tanaka et al. | |
| 7,035,090 B2 * | 4/2006 | Tanaka | G06F 1/162 345/169 |
| 7,609,514 B2 * | 10/2009 | Doczy | G06F 1/1616 312/223.1 |
| 7,652,873 B2 | 1/2010 | Lee | |

(Continued)

FOREIGN PATENT DOCUMENTS

JP    2004164528 A    6/2004
KR    10-2006-0004721    1/2006

(Continued)

*Primary Examiner* — Anthony Q Edwards
(74) *Attorney, Agent, or Firm* — HP Inc. Patent Department

(57) ABSTRACT

Examples disclosed herein provide a computing device. One example computing device includes a base member, a support member rotatably connected to the base member at a first end of the support member, a display member rotatably connected at a second end of the support member opposite the first end, and a latch mechanism disposed along a back side of the base member. When the computing device is to change from a first operation mode to a second operation mode, the display member is to depress the latch mechanism to make contact with the fixed shaft.

15 Claims, 7 Drawing Sheets

(56) References Cited

U.S. PATENT DOCUMENTS

| | | | |
|---|---|---|---|
| 8,687,354 B2 | 4/2014 | Uchiyama et al. | |
| 9,280,181 B2* | 3/2016 | Tomita | G06F 1/1637 |
| 2004/0114315 A1* | 6/2004 | Anlauff | G06F 1/162 |
| | | | 361/679.28 |
| 2005/0063145 A1 | 3/2005 | Homer et al. | |
| 2006/0077622 A1 | 4/2006 | Keely et al. | |
| 2008/0304217 A1* | 12/2008 | Lai | G06F 1/1616 |
| | | | 361/679.26 |
| 2013/0135809 A1 | 5/2013 | Uchiyama et al. | |
| 2013/0178161 A1* | 7/2013 | Shulenberger | G06F 1/162 |
| | | | 455/41.2 |
| 2013/0194739 A1* | 8/2013 | Nakajima | G06F 1/1616 |
| | | | 361/679.09 |
| 2014/0043749 A1* | 2/2014 | Lai | G06F 1/162 |
| | | | 361/679.27 |
| 2014/0098474 A1 | 4/2014 | Bhowmik et al. | |
| 2014/0157546 A1 | 6/2014 | Ho et al. | |
| 2014/0218847 A1* | 8/2014 | Lin | G06F 1/1681 |
| | | | 361/679.01 |
| 2014/0321038 A1* | 10/2014 | Park | G06F 1/1681 |
| | | | 361/679.09 |
| 2015/0002998 A1* | 1/2015 | Arima | G06F 1/1637 |
| | | | 361/679.27 |
| 2015/0131218 A1* | 5/2015 | Yeh | G06F 1/1681 |
| | | | 361/679.07 |
| 2016/0062394 A1* | 3/2016 | Zhang | G06F 1/1667 |
| | | | 361/679.09 |
| 2016/0299533 A1* | 10/2016 | Mehandjiysky | G06F 1/1679 |
| 2017/0075383 A1* | 3/2017 | Park | G06F 1/162 |
| 2017/0192468 A1* | 7/2017 | Park | G06F 1/1681 |
| 2017/0220075 A1* | 8/2017 | Park | G06F 1/1656 |

FOREIGN PATENT DOCUMENTS

| | | |
|---|---|---|
| KR | 10-2008-0034646 | 4/2008 |
| TW | M434238 | 7/2012 |
| TW | M439836 | 10/2012 |
| WO | WO-2009034484 | 3/2009 |
| WO | 2012-134087 | 10/2012 |

* cited by examiner

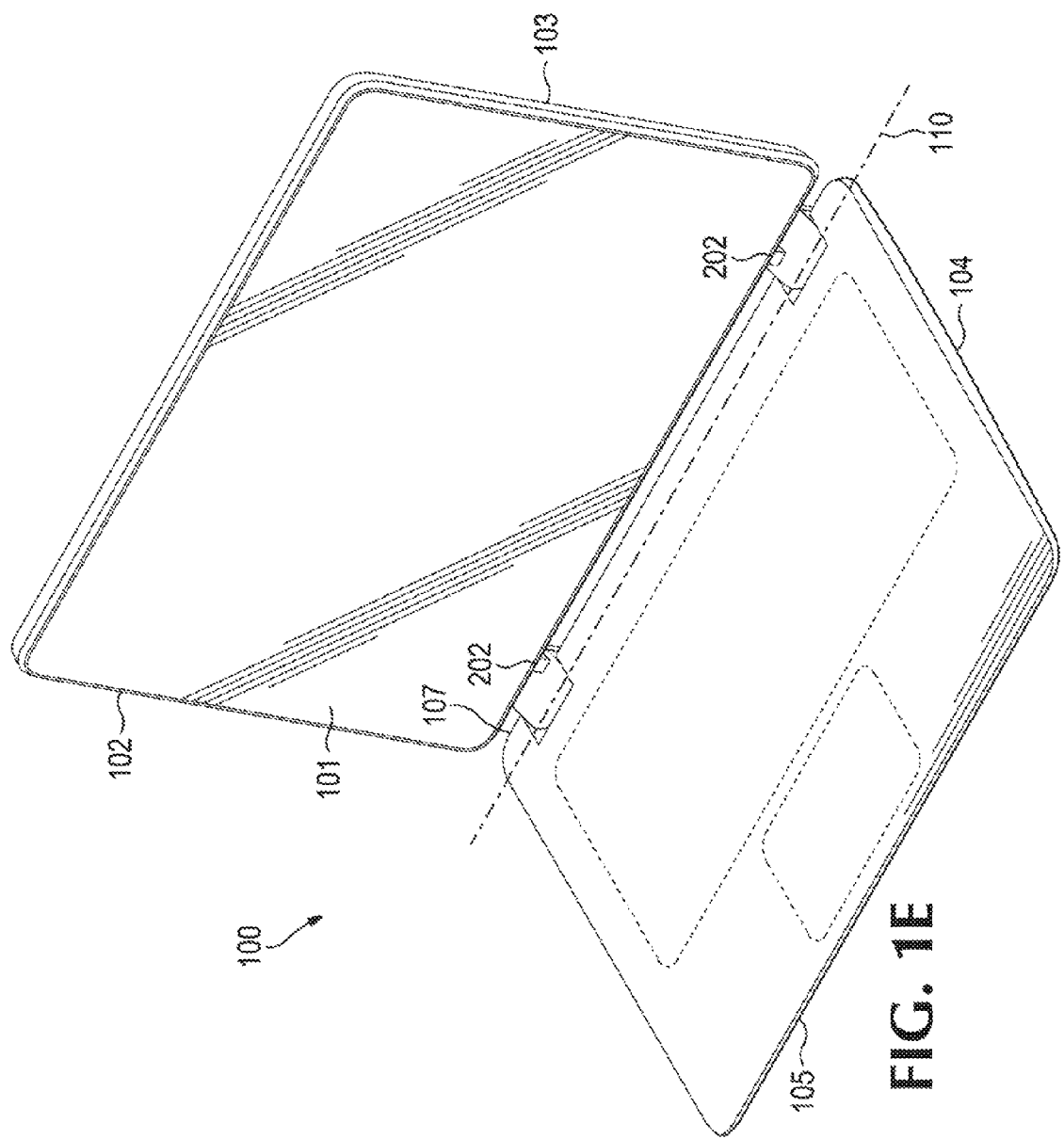

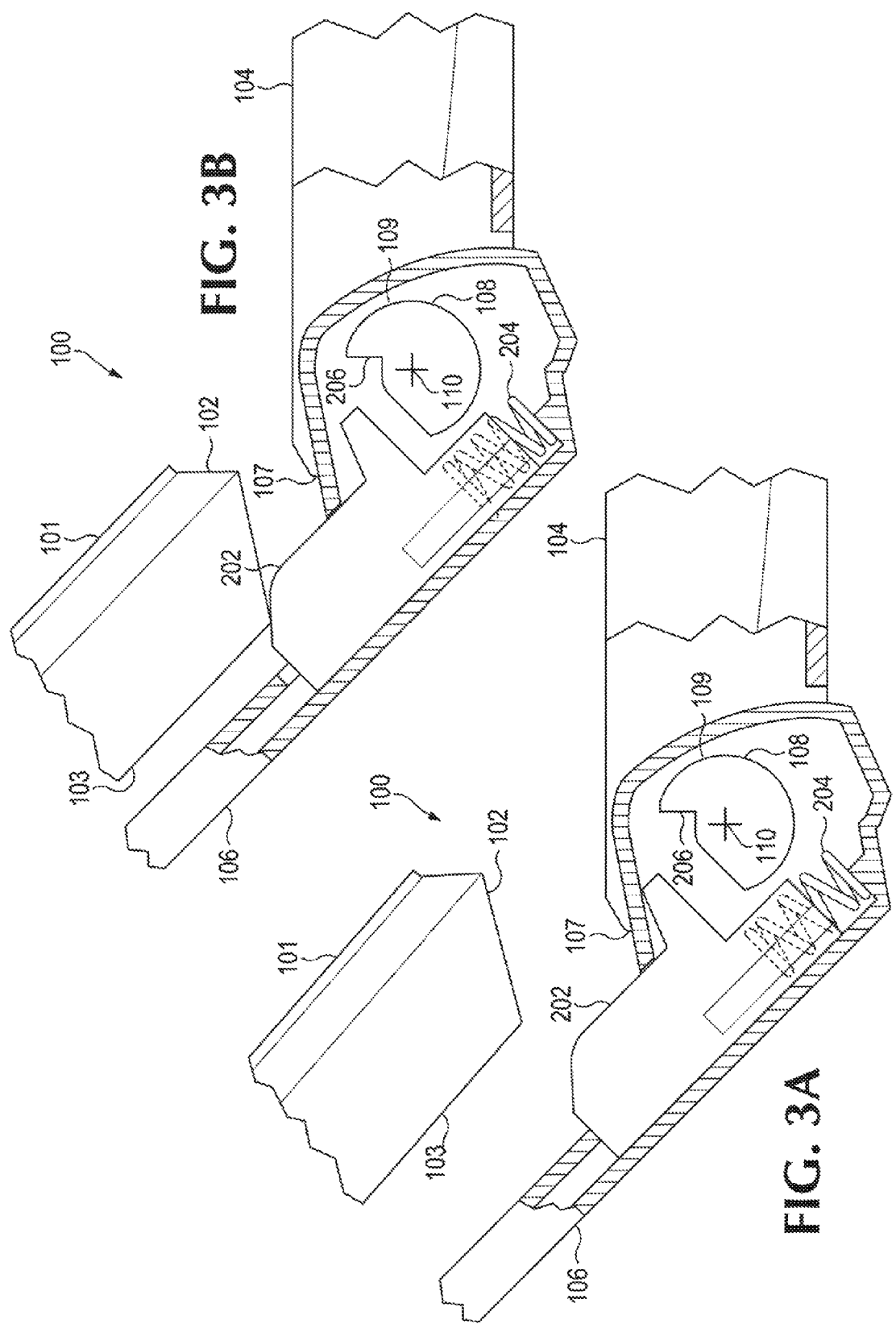

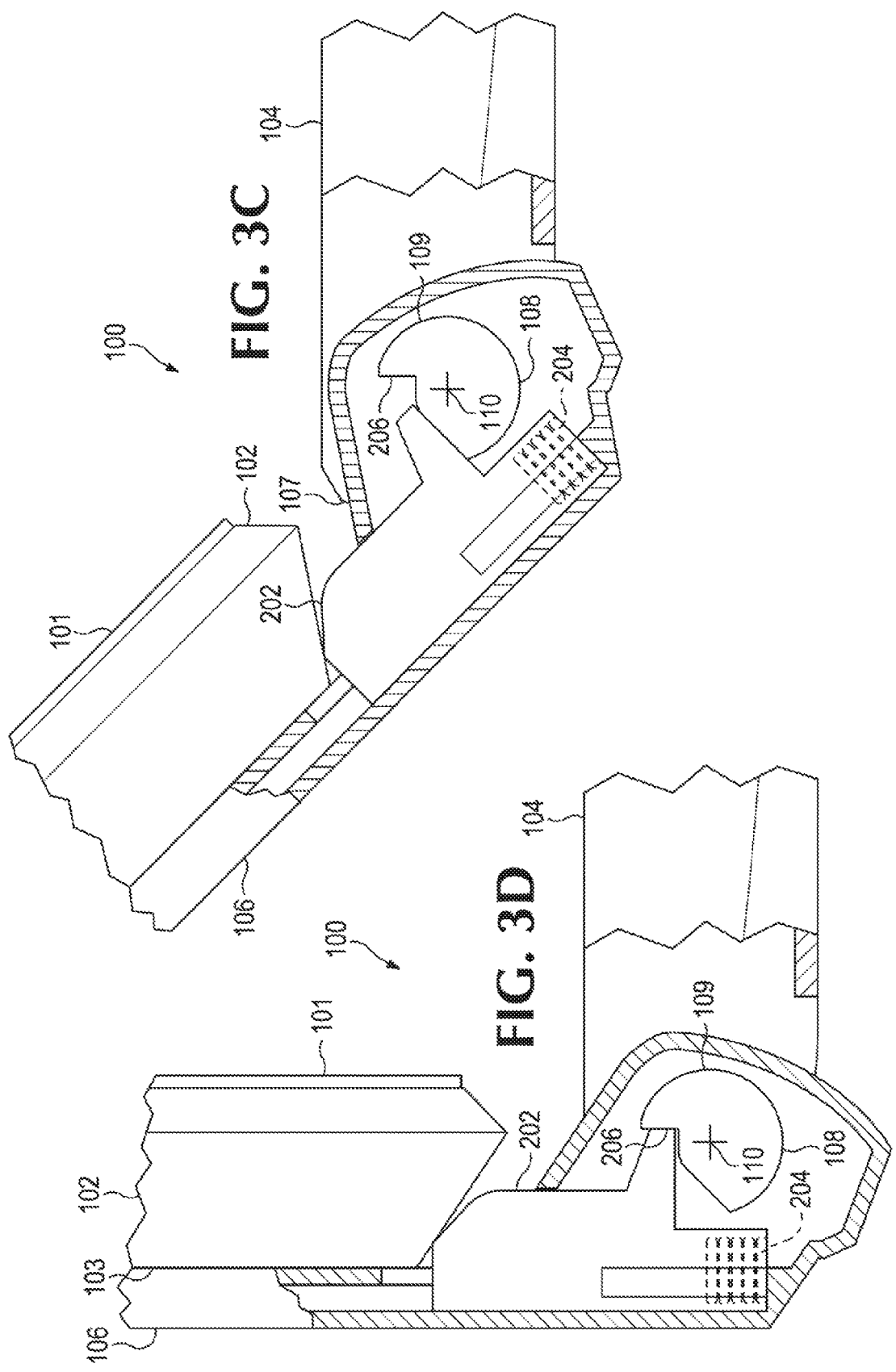

COMPUTING DEVICE WITH A ROTABLE DISPLAY MEMBER

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two members connected together at a common end via one or more hinges, for example. In most cases, a first or display member is utilized to provide a viewable display to a user while a second or base member includes an area for user input (e.g., touchpad and keyboard). In addition, the viewable display may be a touchscreen (e.g., touchscreen laptop), allowing the user to interact directly with what is displayed by touching the screen with simple or multi-touch gestures.

BRIEF DESCRIPTION OF THE DRAWINGS

FIGS. 1A-E illustrate a computing device transitioned from a tablet operation mode to a laptop operation mode, as an example;

FIGS. 3A-D illustrate the positioning or activation of the latch mechanism as the computing device is transitioned to laptop operation mode, as an example.

DETAILED DESCRIPTION

Figure 1A:
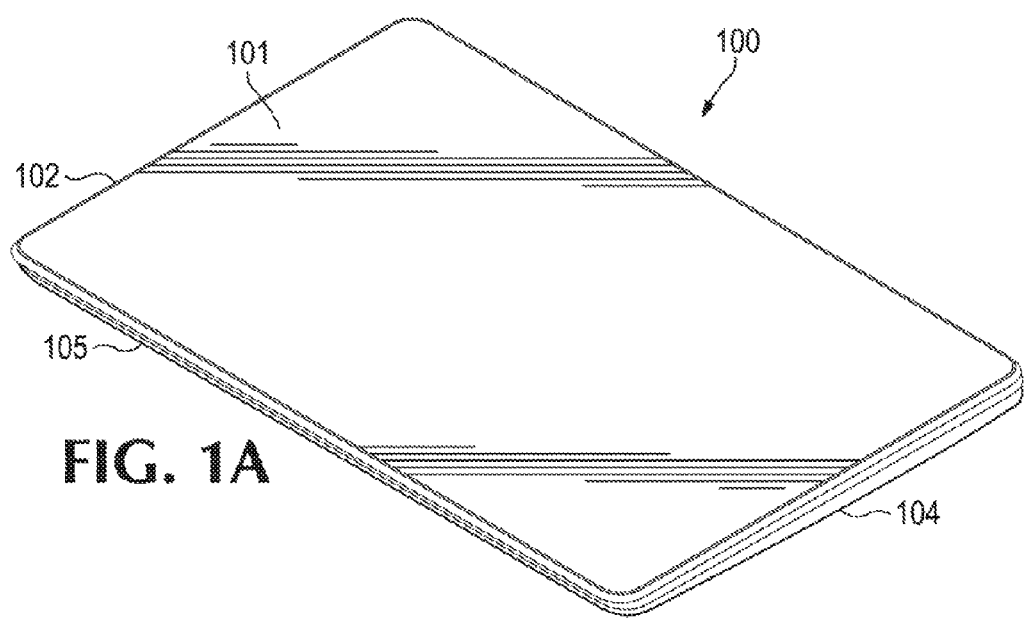
Figure 1B:
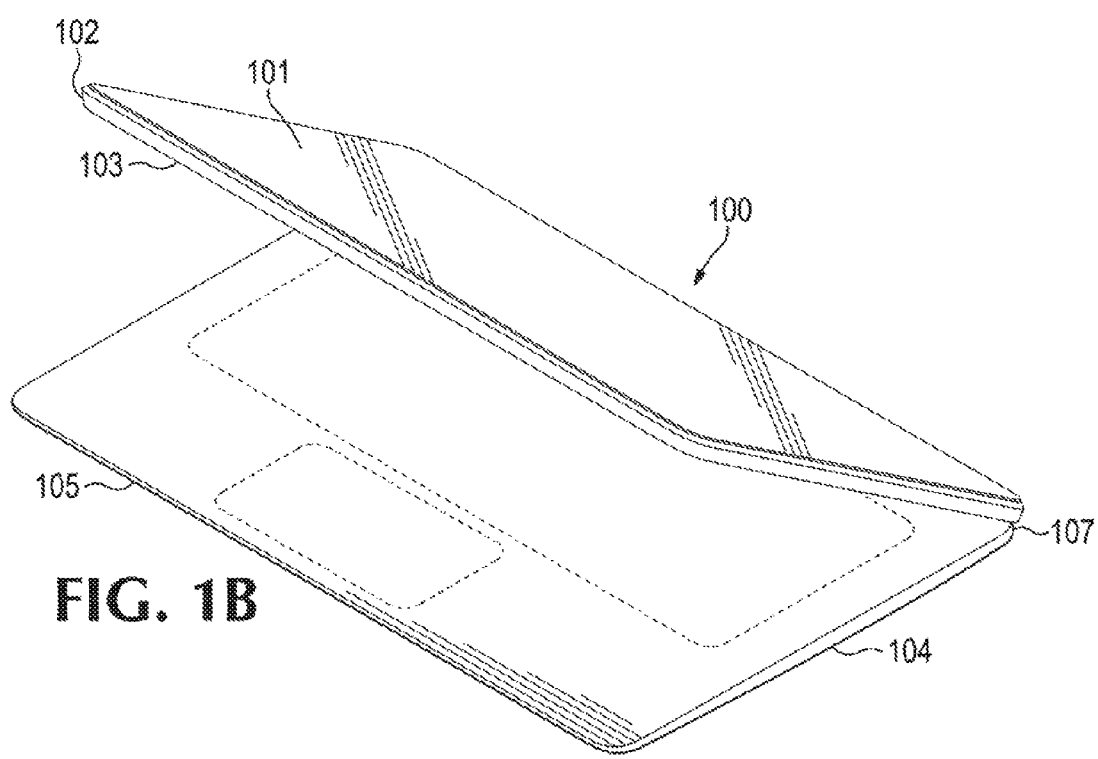

Notebook computers may include a feature that allows the device to be "converted" from one style of use to at least another style of use. For example, a notebook computer may be converted from a laptop operation mode, where the touchpad and keyboard is used as input, to a tablet operation mode, where the viewable display is used for both viewing and input. Such devices that serve this dual purpose may be called convertible laptops. Many form factors exist for convertible laptops.

Examples disclosed herein provide a form factor for a convertible laptop including a mechanism that allows the display member to flip over when operating the laptop in tablet mode. For example, from laptop mode, the display member may be flipped over via the mechanism to operate the viewable display of the laptop as a tablet. As a result of flipping the display member over, the display member and base member may be collapsed against each other in an open, folded position. In this open, folded position, the touchpad and keyboard of the base member may be covered by the back surface of the display member.

In one example, a computing device includes a base member, a support member rotatably connected to the base member at a first end of the support member, a display member rotatably connected at a second end of the support member opposite the first end, and a latch mechanism disposed along a back side of the base member. When the computing device is to change from a first operation mode to a second operation mode, the display member is to depress the latch mechanism to make contact with the fixed shaft.

In another example, a computing device includes a base member, a support member rotatably connected to the base member at a first end of the support member, a display member rotatably connected at a second end of the support member opposite the first end, and a mechanism to control rotation of the support member around the first axis of rotation. The mechanism includes a fixed shaft, disposed within the base member, and a latch disposed along a back side of the base member. The support member is to rotate around the first axis of rotation via the fixed shaft. When the computing device is to change from a first operation mode to a second operation mode, the display member is to depress the latch to make contact with the fixed shaft.

In yet another example, a computing device includes a base member, a support member rotatably connected to the base member at a first end of the support member, a display member rotatably connected at a second end of the support member opposite the first end, and a latch mechanism disposed along a back side of the base member. When the computing device is to change from a tablet operation mode to a laptop operation mode, the display member is to activate the latch mechanism to make contact with the fixed shaft.

With reference to the figures, FIGS. 1A-E illustrate a computing device 100 transitioned from a tablet operation mode to a laptop operation mode, as an example. The device 100 includes a display member 102 and a base member 104 that are joined together via a support member 106. The base member 104 includes a top surface that may include input means for operation by a user, such as a keyboard and/or a touchpad. In addition, the base member 104 includes a front side 105 and a back side 107 opposite the front side 105. The display member 102 includes a display surface 101 and a back surface 103 opposite the display surface 101. As an example, the display surface 101 may be used for viewing the video output of the laptop 100, and include input means for operation by a user, such as a touchscreen.

Figure 2:
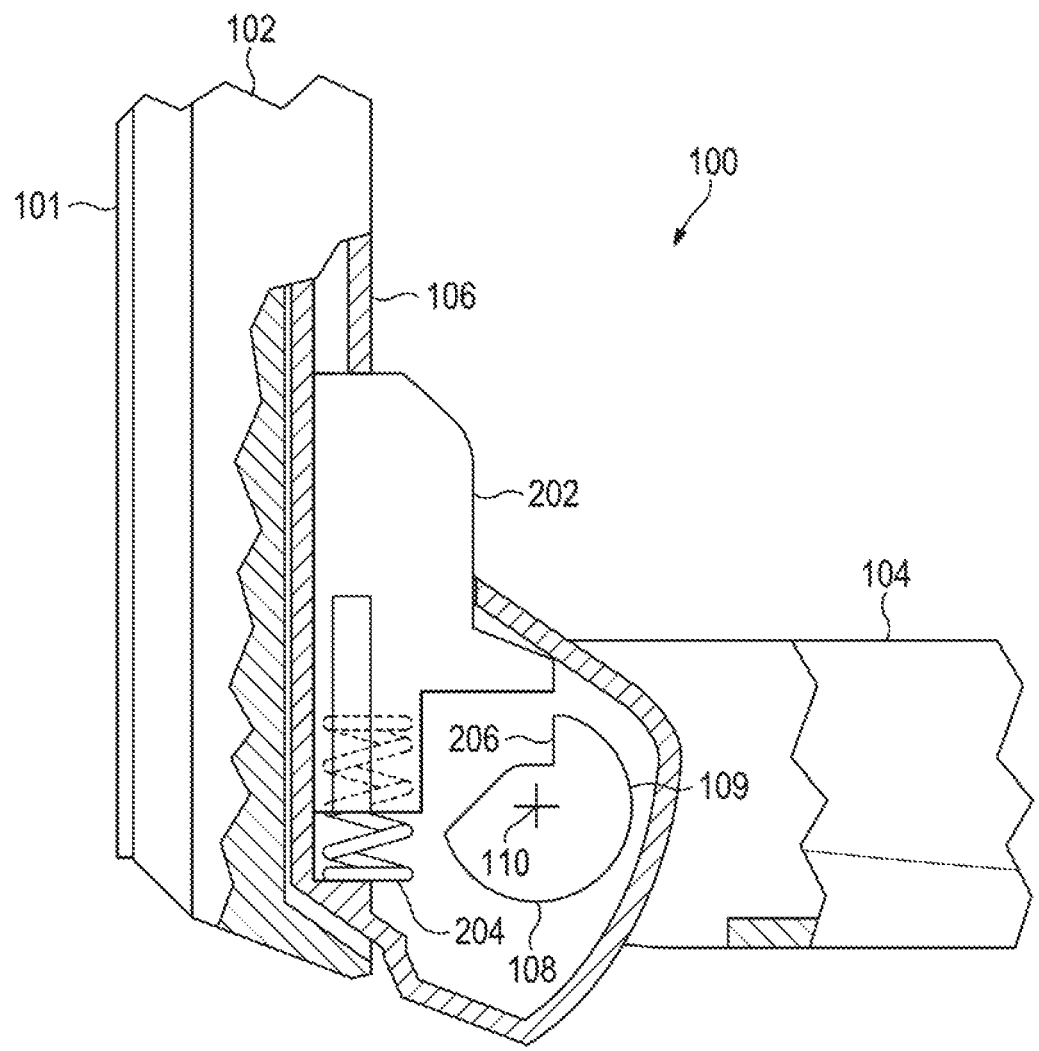
FIG. 2 illustrates a side profile of a latch mechanism as the computing device is in the position illustrated in FIG. 1C, as an example.

The support member 106 may be rotatably connected to the base member 104 via a shaft 108 at a first end of the support member 106 (e.g., see FIG. 2). As an example, the shaft 108 may be fixed within the base member 104 and the support member 106 may be rotatably connected to the base member 104 around a first axis of rotation 110. The display member 102 may be rotatably connected at a second end of the support member 106 opposite the first end. As an example, the support member 106 may be rotatably connected to the base member 104 around the first axis of rotation 110, and the display member 102 may be rotatably connected to the support member 106 around a second axis of rotation 120 that is parallel to the first axis of rotation 110.

Figure 1C:
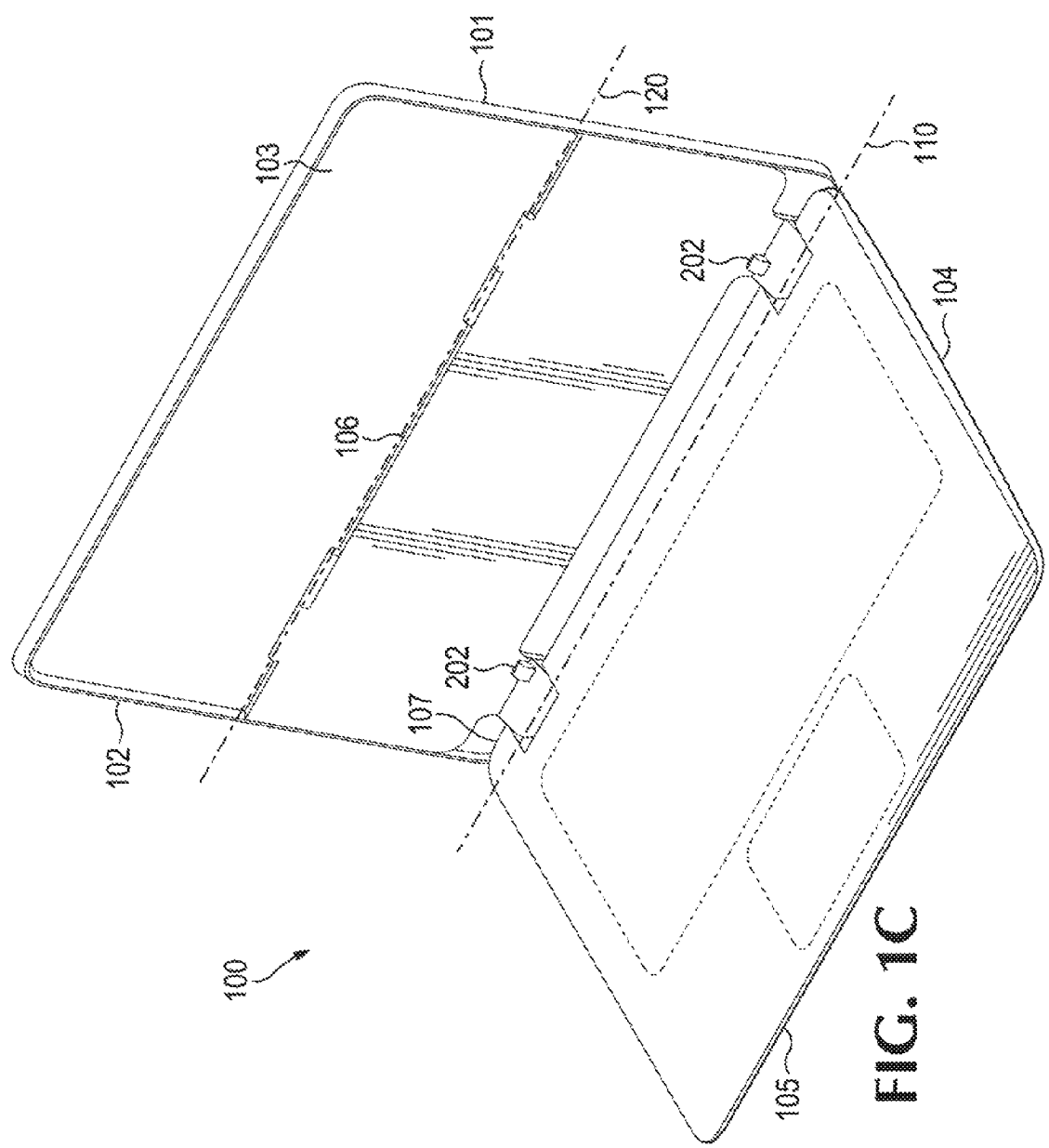
Figure 1D:
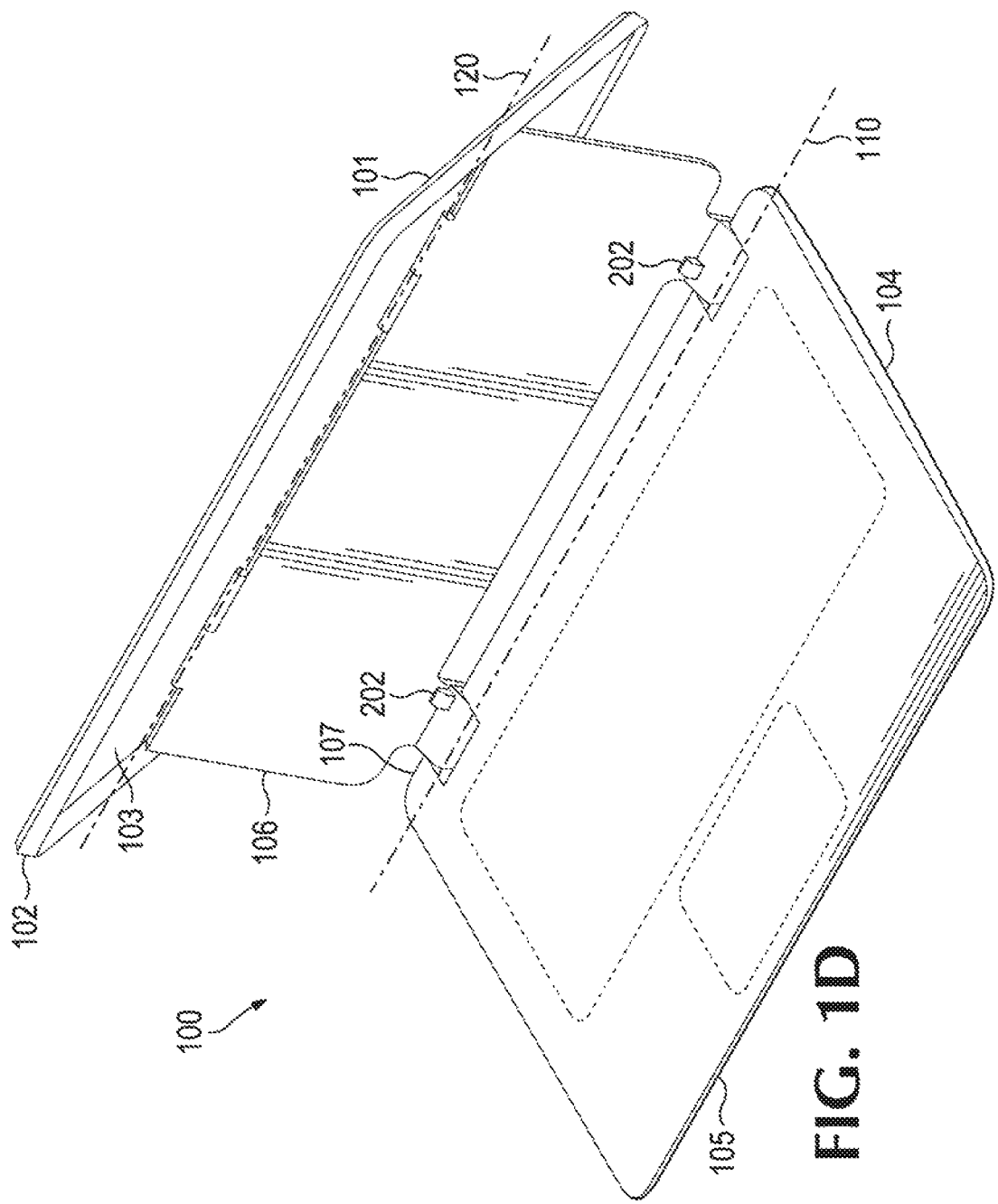

The pivot between the display member 102 and the support member 106 may allow for the display member 102 to pivot a full 180 degrees (e.g., see FIGS. 1C-E). Referring to FIG. 1A, the display member 102 may pivot around the support member 106 to operate in a tablet operation mode. While in tablet operation mode, the display member 102 and base member 104 may be in a parallel orientation and collapsed against each other in an open, folded position. In this open, folded position, the touchpad and keyboard of the base member 104 may be covered by the back surface 103 of the display member 102.

As an example, the display member 102 may be connected to the second end of the support member 106 via hinges having two pivot points. A first pivot point of the hinges may be attached to the back surface 103 of the display member 102, and a second pivot point of the hinges may be attached to the support member 106. The two pivot points may collectively make the second axis of rotation 120.

When a user operates a convertible laptop in its various modes, it is desirable for the laptop to feel sturdy and rigid.

For example, when the user operates the laptop in laptop mode by setting the display member at an appropriate viewing angle, it is not desirable for the display member to fall forwards or backwards as the user operates the laptop. Referring to FIG. 1E, the support member 106 may be rotatably connected to the base member 104 via friction hinges that, for example, provide friction for resisting a torque provided by a user while operating the computing device 100. The friction hinges, rotating around the first axis of rotation 110 via the shaft 108, may allow for the display member 102 to be viewed at a variety of viewing angles. As an example, the friction hinges may support the display member 102 at any desired open angle with sufficient resistance to allow, for example, touch screen computing. As illustrated in FIG. 1E, the display member 102 may form an angle with respect to the base member 104, which may be an appropriate angle for the device 100 to be operated in laptop mode where, for example, the touchpad and/or keyboard is used as input.

Referring to FIG. 1E, while the computing device 100 is in laptop operation mode, a user may attempt to close the device 100 to a closed, folded position, similar to how a notebook computer is closed that consists of two members connected together at a common end. While the notebook computer is in the closed, folded position, the notebook computer may be closed and the display surface of the notebook computer may not be visible (e.g., the display surface may cover the top surface of the base member of the notebook computer). However, it may not be possible to close the computing device 100 to the closed, folded position. For example, as the display member 102 is not rotatably connected to the base member 104, the computing device 100 may not be closed to the closed, folded position. Doing so may damage the mechanisms coupling the display member 102 and the base member 104 to the support member 106.

As an example, the computing device 100 may include a latch mechanism 202 for preventing users from closing the device 100 to the closed, folded position. As will be further described, the latch mechanism 202 may be activated as the device 100 is transitioned from tablet mode to laptop mode. Once the latch mechanism 202 is activated, when attempting to close the computing device 100 to the closed, folded position, users may be reminded that the device 100 cannot be closed in such a manner. As a result, the latch mechanism 202 may prevent damage to the mechanisms coupling the display member 102 and the base member 104 to the support member 106.

FIG. 2 illustrates a side profile of the latch mechanism 202 as the computing device 100 is in the position illustrated in FIG. 1, as an example. The latch mechanism 202 may be part of a stopper mechanism, for preventing users from closing the computing device 100, while it is in laptop mode, to the closed, folded position. The stopper mechanism may include the shaft 108, fixed within the base member 104. As an example, the contact the latch mechanism 202 makes with the shaft 108 may control or limit the rotation of the support member 106 around the first axis of rotation 110. Referring back to FIG. 1C, the latch mechanism 202 may be disposed along the back side 107 of the base member. As illustrated, the latch mechanism 202 may be exposed from the support member 106. Similarly, the latch mechanism 202 may make contact with the shaft 108 via the opening in the support member 106, as will be further described. Although multiple latch mechanisms 202 are illustrated, a different number of latch mechanisms 202 may be utilized.

Referring to FIG. 2, the stopper mechanism may include a spring 204, disposed within the support member 106. The spring 204 may be connected to the latch mechanism 202, for keeping the latch mechanism 202 extended and away from the shaft 108. While the latch mechanism 202 is extended away from the shaft 108, the support member 106 may rotate freely, via the fixed shaft 108, around the first axis of rotation 110.

FIGS. 3A-D illustrate the positioning or activation of the latch mechanism 202 as the computing device 100 is transitioned to laptop operation mode, as an example. When the computing device 100 changes from a first operation mode, such as tablet mode (e.g., see FIG. 1A), to a second operation mode, such as laptop mode (e.g., see FIG. 1E), the display member 102 may depress or push down the latch mechanism 202 to make contact with the fixed shaft 108. The force placed on the latch mechanism 202 by the display member 102 may be greater than the opposing force provided by the spring 204, resulting in the latch mechanism 202 activating and making contact with the fixed shaft 108 (e.g., see FIGS. 3A-C).

Referring to FIG. 3C, where the computing device 100 is in the position illustrated in FIG. 1E (e.g., laptop operation mode), the latch mechanism 202 may be fully depressed or pushed down to make contact with the shaft 108. The contact the latch mechanism 202 makes with the shaft 108 may control or limit the rotation of the support member 106 around the first axis of rotation 110. As an example, the shaft 108 may include a notch 206 disposed along an outside perimeter of the shaft 108. As illustrated in FIG. 3D, as the latch mechanism 202 makes contact with the notch 206 of the shaft 108, the rotation of the support member 106 around the first axis of rotation 110 may be limited.

Referring to FIG. 3D, the support member 106 of the computing device 100 may rotate to a hard stop around the first axis of rotation 110 upon the latch mechanism 202 making contact with the notch 206. Upon reaching the hard stop, the computing device 100 may not be rotated any further. For example, the hard stop may prevent the computing device 100 from being closed to the closed, folded position described above. The hard stop may remind users that the computing device cannot be closed in such a manner. Thereafter, the user may keep computing device 100 in laptop mode, or revert the computing device 100 back to tablet mode by following the steps illustrated in FIGS. 1A-E in reverse order.

As an example, when transitioning the computing device 100 back to tablet mode, as the display member 102 is lifted away from the support member 106, the force provided by the spring 204 may extend the latch mechanism 202 from the depressed position, away from the fixed shaft 108. As a result, the support member 106 may then rotate freely via the fixed shaft 108 around the first axis of rotation 110. Referring back to FIG. 3A, as latch mechanism 202 no longer makes contact with the shaft 108, the support member 106 may rotate freely around the first axis of rotation.

It is appreciated that examples described herein below may include various components and features. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computing device comprising:
   a base member including a front side and a back side opposite the front side;
   a support member rotatably connected to the base member at a first end of the support member, via a fixed shaft around a first axis of rotation;
   a display member rotatably connected at a second end of the support member opposite the first end, around a second axis of rotation that is parallel to the first axis of rotation; and
   a latch mechanism disposed along the back side of the base member, wherein, when the computing device is to change from a first operation mode to a second operation mode, the display member is to depress the latch mechanism to make contact with the fixed shaft.

2. The computing device of claim 1, wherein, when the latch mechanism is depressed to make contact with the fixed shaft, the support member is to rotate to a hard stop around the first axis of rotation upon the latch mechanism making contact with a notch of the fixed shaft.

3. The computing device of claim 1, wherein, when the computing device is to change from the second operation mode to the first operation mode, the latch mechanism is to extend from the depressed position, away from the fixed shaft.

4. The computing device of claim 3, comprising a spring, wherein the spring is connected to the latch mechanism, and wherein the spring is to extend the latch mechanism from the depressed position.

5. The computing device of claim 3, wherein, when the latch mechanism is extended from the depressed position, the support member is to rotate freely via the fixed shaft around the first axis of rotation.

6. The computing device of claim 1, wherein the first operation mode corresponds to a tablet operation mode, wherein the second operation mode corresponds to a laptop operation mode, and wherein the display member and the base member are in a parallel orientation when the computing device is in the first operation mode.

7. A computing device comprising:
   a base member including a front side and a back side opposite the front side;
   a support member rotatably connected to the base member at a first end of the support member, around a first axis of rotation;
   a display member rotatably connected at a second end of the support member opposite the first end, around a second axis of rotation that is parallel to the first axis of rotation; and
   a mechanism to control rotation of the support member around the first axis of rotation, the mechanism comprising:
      a fixed shaft disposed within the base member, wherein the support member is to rotate around the first axis of rotation via the fixed shaft; and
      a latch disposed along the back side of the base member, wherein, when the computing device is to change from a first operation mode to a second operation mode, the display member is to depress the latch to make contact with the fixed shaft.

8. The computing device of claim 7, wherein, when the latch is depressed to make contact with the fixed shaft, the support member is to rotate to a hard stop around the first axis of rotation upon the latch making contact with a notch of the fixed shaft.

9. The computing device of claim 7, wherein, when the computing device is to change from the second operation mode to the first operation, mode, the latch is to extend from the depressed position, away from the fixed shaft.

10. The computing device of claim 9, wherein the mechanism comprises a spring, wherein the spring is connected to the latch, and wherein the spring is to extend the latch from the depressed position.

11. The computing device of claim 9, wherein, when the latch is extended from the depressed position, the support member is to rotate freely via the fixed shaft around the first axis of rotation.

12. A computing device comprising:
   a base member including a front side and a back side opposite the front side;
   a support member rotatably connected to the base member at a first end of the support member, via a fixed shaft around a first axis of rotation;
   a display member rotatably connected at a second end of the support member opposite the first end, around a second axis of rotation that is parallel to the first axis of rotation; and
   a latch mechanism disposed along the back side of the base member, wherein, when the computing device is to change from a tablet operation mode to a laptop operation mode, the display member is to activate the latch mechanism to make contact with the fixed shaft.

13. The computing device of claim 12, wherein, when the latch mechanism is activated to make contact with the fixed shaft, the support member is to rotate to a hard stop around the first axis of rotation upon the latch mechanism making contact with a notch of the fixed shaft.

14. The computing device of claim 12, wherein, when the computing device is to change from the laptop operation mode to the tablet operation mode, the latch mechanism is to extend from the activated position, away from the fixed shaft.

15. The computing device of claim 14, comprising a spring, wherein the spring is connected to the latch mechanism, and wherein the spring is to extend the latch mechanism from the activated position.

* * * * *

UNITED STATES PATENT AND TRADEMARK OFFICE
CERTIFICATE OF CORRECTION

PATENT NO. : 9,933,814 B2  
APPLICATION NO. : 15/308311  
DATED : April 3, 2018  
INVENTOR(S) : Chan Park et al.

It is certified that error appears in the above-identified patent and that said Letters Patent is hereby corrected as shown below:

On the Title Page

In item (54), and in the Specification, in Column 1, Line 1, Title, delete "ROTABLE" and insert -- ROTATABLE --, therefor.

In the Claims

In Column 6, Line 24, in Claim 9, delete "operation," and insert -- operation --, therefor.

Signed and Sealed this  
Fourth Day of September, 2018

Andrei Iancu  
*Director of the United States Patent and Trademark Office*